US012347128B2

(12) United States Patent
Wilfred et al.

(10) Patent No.: US 12,347,128 B2
(45) Date of Patent: Jul. 1, 2025

(54) PRODUCT VOLUMETRIC ASSESSMENT USING BI-OPTIC SCANNER

(71) Applicant: ZEBRA TECHNOLOGIES CORPORATION, Lincolnshire, IL (US)

(72) Inventors: Sajan Wilfred, Kollam (IN); John Britts, Port Jefferson Station, NY (US); David R. Turturro, Farmingville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 463 days.

(21) Appl. No.: 17/958,141

(22) Filed: Sep. 30, 2022

(65) Prior Publication Data
US 2024/0112361 A1 Apr. 4, 2024

(51) Int. Cl.
*G06T 7/62* (2017.01)
(52) U.S. Cl.
CPC ..................... *G06T 7/62* (2017.01)
(58) Field of Classification Search
CPC ....................................................... G06T 7/62
USPC ....................................................... 382/128
See application file for complete search history.

(56) References Cited

U.S. PATENT DOCUMENTS

| 10,593,130 | B2* | 3/2020 | Ackley | G01B 11/00 |
| 10,713,803 | B1* | 7/2020 | Le | G06V 20/80 |
| 2008/0041959 | A1 | 2/2008 | Knowles et al. | |
| 2017/0030766 | A1 | 2/2017 | Hendrick | |
| 2021/0342772 | A1 | 11/2021 | Tiwari et al. | |

OTHER PUBLICATIONS

International Search Report and Written Opinion for International Application No. PCT/US2023/28238 mailed on Oct. 10, 2023.

* cited by examiner

*Primary Examiner* — Quang N Vo
(74) *Attorney, Agent, or Firm* — Yuri Astvatsaturov

(57) ABSTRACT

Techniques for volumetric assessment of a product based on images captured by a bi-optic scanner are disclosed herein. An example system includes a first imaging assembly, having a field of view of a product scanning region, configured to capture a first image of an item passing through the product scanning region; a second imaging assembly, having an orthogonal field of view, configured to capture a second image of the item passing through the product scanning region at the same time; processors; and a memory storing instructions that, when executed, cause the processors to: determine a first distance of the item from an edge of the first field of view based on the first image; determine a second distance of the item from the a corresponding edge of the second field of view based on the second image; and generate an estimated volume of the item based on the first image, the first distance, the second image, and the second distance.

23 Claims, 6 Drawing Sheets

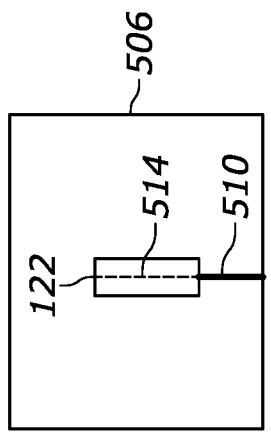
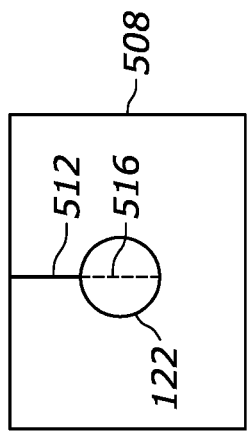
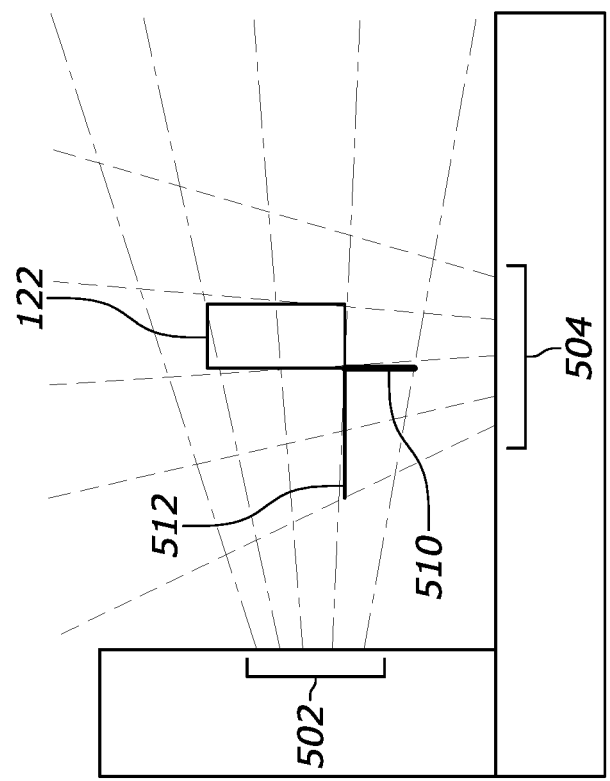

PRODUCT VOLUMETRIC ASSESSMENT USING BI-OPTIC SCANNER

BACKGROUND

In a retail environment, there are many benefits to determining the volume of an item to be purchased. For instance, the volume of an item to be purchased may be used to distinguish between "lookalike" products in computer vision applications. That is, the volume of the item may be used as an additional input to distinguish between products that otherwise appear similarly in images (e.g., multiple sizes of the same type of product). As another example, the volume of an item to be purchased may be used to detect instances of "ticket switching," i.e., instances in which an incorrect barcode is affixed to an item in order to obtain a lower price for the item. That is, if the volume of the item to be purchased does not match the volume of the item identified by the barcode, an instance of ticket switching may be occurring. Furthermore, in some examples, the volume of an item to be purchased may be used to generate the price of the item. Additionally, in some examples, the volume of an item to be purchased may be used to determine which packaging or checkout bag should be used for the item, and/or how various items should be arranged within the packaging or checkout bag.

However, automatically calculating the volume of an item is still a costly and challenging affair, requiring, e.g., the installation of additional equipment, such as 3D vision cameras, or microwave or ultrasonic depth sensors, as well as very controlled environments where the item is completely still. These are generally costly and require special arrangements and procedures, and are typically infeasible, especially at the point of sale (POS). Thus, a cost-effective method for volumetric assessment of products that can be performed in real-time using existing equipment, with no change to product scanning procedures, is needed.

SUMMARY

In an embodiment, the present invention is a system for volumetric assessment of a product based on images captured by a scanning arrangement having multiple imaging assemblies, comprising: a first imaging assembly, having a first field of view of a product scanning region, configured to capture a first image of an item passing through the product scanning region at a time; a second imaging assembly, having a second field of view of the product scanning region, the second imaging assembly being configured to capture a second image of the item passing through the product scanning region at a second time that is either the same or substantially the same as the time; one or more processors; and a memory storing computer readable instructions that, when executed by the one or more processors, cause the one or more processors to: determine a first distance of the item from an edge of the first field of view based on the first image; determine a second distance of the item from a corresponding edge of the second field of view based on the second image; and generate an estimated volume of the item based on the first image, the first distance, the second image, and the second distance.

In a variation of this embodiment, generating the estimated volume of the item based on the first image, the first distance, the second image, and the second distance further includes: analyzing the first image using segmentation to identify a first outer boundary of the item in the first image; and analyzing the second image using segmentation to identify a second outer boundary of the item in the second image.

Moreover, in a variation of this embodiment, generating the estimated volume of the item based on the first image, the first distance, the second image, and the second distance further includes: determining a first relative area of the first outer boundary of the item in the first image; determining a second relative area of the second outer boundary of the item in the second image; determining a first actual area of the first outer boundary of the item in the first image based on the first relative area of the first outer boundary of the item in the first image and the first distance; and determining a second actual area of the second outer boundary of the item in the second image based on the second relative area of the second outer boundary of the item in the second image and the second distance; wherein generating the estimated volume is based on the first actual area and the second actual area.

Furthermore, in a variation of this embodiment, the instructions, when executed by the one or more processors, further cause the one or more processors to: determine, based on one or more of the first or second image, a first possible identification of the item and a second possible identification of the item; and select between the first identification of the item and the second identification of the item based on the estimated volume of the item.

Additionally, in a variation of this embodiment, the instructions, when executed by the one or more processors, further cause the one or more processors to: determine, based on decoding a barcode affixed to the item in one or more of the first or second image, a possible identification of the item; determine, based on the possible identification of the item, a volume associated with the possible identification of the item; compare the determined volume associated with the possible identification of the item to the estimated volume of the item; and generate an alert based on a volume difference between the determined volume associated with the possible identification of the item and the estimated volume of the item being greater than a threshold volume difference.

In another embodiment, the present invention is a method for volumetric assessment of a product based on images captured by scanning arrangement having multiple imaging assemblies, comprising: capturing, by a first imaging assembly, having a first field of view of a product scanning region, a first image of an item passing through the product scanning region at a time; capturing, by a second imaging assembly, having a second field of view of the product scanning region, a second image of the item passing through the product scanning region at substantially the same time; determining, by one or more processors, a first distance of the item from an edge of the first field of view based on the first image; determining, by the one or more processors, a second distance of the item from a corresponding edge of the second field of view based on the second image; and generating, by the one or more processors, an estimated volume of the item based on the first image, the first distance, the second image, and the second distance.

In a variation of this embodiment, generating the estimated volume of the item based on the first image, the first distance, the second image, and the second distance further includes: analyzing the first image using segmentation to identify a first outer boundary of the item in the first image; and analyzing the second image using segmentation to identify a second outer boundary of the item in the second image.

Moreover, in a variation of this embodiment, generating the estimated volume of the item based on the first image, the first distance, the second image, and the second distance further includes: determining a first relative area of the first outer boundary of the item in the first image; determining a second relative area of the second outer boundary of the item in the second image; determining a first actual area of the first outer boundary of the item in the first image based on the first relative area of the first outer boundary of the item in the first image and the first distance; and determining a second actual area of the second outer boundary of the item in the second image based on the second relative area of the second outer boundary of the item in the second image and the second distance; wherein generating the estimated volume is based on the first actual area and the second actual area.

Furthermore, in a variation of this embodiment, the method further includes determining, by the one or more processors, based on one or more of the first or second image, a first possible identification of the item and a second possible identification of the item; and selecting, by the one or more processors, between the first identification of the item and the second identification of the item based on the estimated volume of the item.

Additionally, in a variation of this embodiment, the method further includes determining, by the one or more processors, based on decoding a barcode affixed to the item in one or more of the first or second image, a possible identification of the item; determining, by the one or more processors, based on the possible identification of the item, a volume associated with the possible identification of the item; comparing, by the one or more processors, the determined volume associated with the possible identification of the item to the estimated volume of the item; and generating, by the one or more processors, an alert based on a volume difference between the determined volume associated with the possible identification of the item and the estimated volume of the item being greater than a threshold volume difference.

In yet another embodiment, the present invention is a tangible machine-readable medium comprising instructions for volumetric assessment of a product based on images captured by a scanning arrangement having multiple imaging assemblies that, when executed, cause a machine to at least: receive a first image of an item passing through a product scanning region at a time, the first image being captured by a first imaging assembly having a first field of view of the product scanning region; receive a second image of the item passing through the product scanning region at substantially the same time, the second image being captured by a second imaging assembly having a second field of view of the product scanning region that is orthogonal to the first field of view of the product scanning region; determine a first distance of the item from an edge of the first field of view based on the first image; determine a second distance of the item from a corresponding edge of the second field of view based on the second image; and generate an estimated volume of the item based on the first image, the first distance, the second image, and the second distance.

In a variation of this embodiment, generating the estimated volume of the item based on the first image, the first distance, the second image, and the second distance further includes: analyzing the first image using segmentation to identify a first outer boundary of the item in the first image; and analyzing the second image using segmentation to identify a second outer boundary of the item in the second image.

Moreover, in a variation of this embodiment, generating the estimated volume of the item based on the first image, the first distance, the second image, and the second distance further includes: determining a first relative area of the first outer boundary of the item in the first image; determining a second relative area of the second outer boundary of the item in the second image; determining a first actual area of the first outer boundary of the item in the first image based on the first relative area of the first outer boundary of the item in the first image and the first distance; and determining a second actual area of the second outer boundary of the item in the second image based on the second relative area of the second outer boundary of the item in the second image and the second distance; wherein generating the estimated volume is based on the first actual area and the second actual area.

Furthermore, in a variation of this embodiment, the instructions, when executed, further cause the machine to: determine, based on one or more of the first or second image, a first possible identification of the item and a second possible identification of the item; and select between the first identification of the item and the second identification of the item based on the estimated volume of the item.

Additionally, in a variation of this embodiment, the instructions, when executed, further cause the machine to: determine, based on decoding a barcode affixed to the item in one or more of the first or second image, a possible identification of the item; determine, based on the possible identification of the item, a volume associated with the possible identification of the item; compare the determined volume associated with the possible identification of the item to the estimated volume of the item; and generate an alert based on a volume difference between the determined volume associated with the possible identification of the item and the estimated volume of the item being greater than a threshold volume difference.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 5A illustrates an example schematic diagram of an item positioned within fields of view of two imaging assemblies of a bi-optic scanner.

FIG. 5B illustrates an example of an image of the item shown at FIG. 5A, as captured by a first imaging assembly of the bi-optic scanner of FIG. 5A.

FIG. 5C illustrates an example of an image of the item shown at FIG. 5A, as captured by a second imaging assembly of the bi-optic scanner of FIG. 5A.

Figure 1:
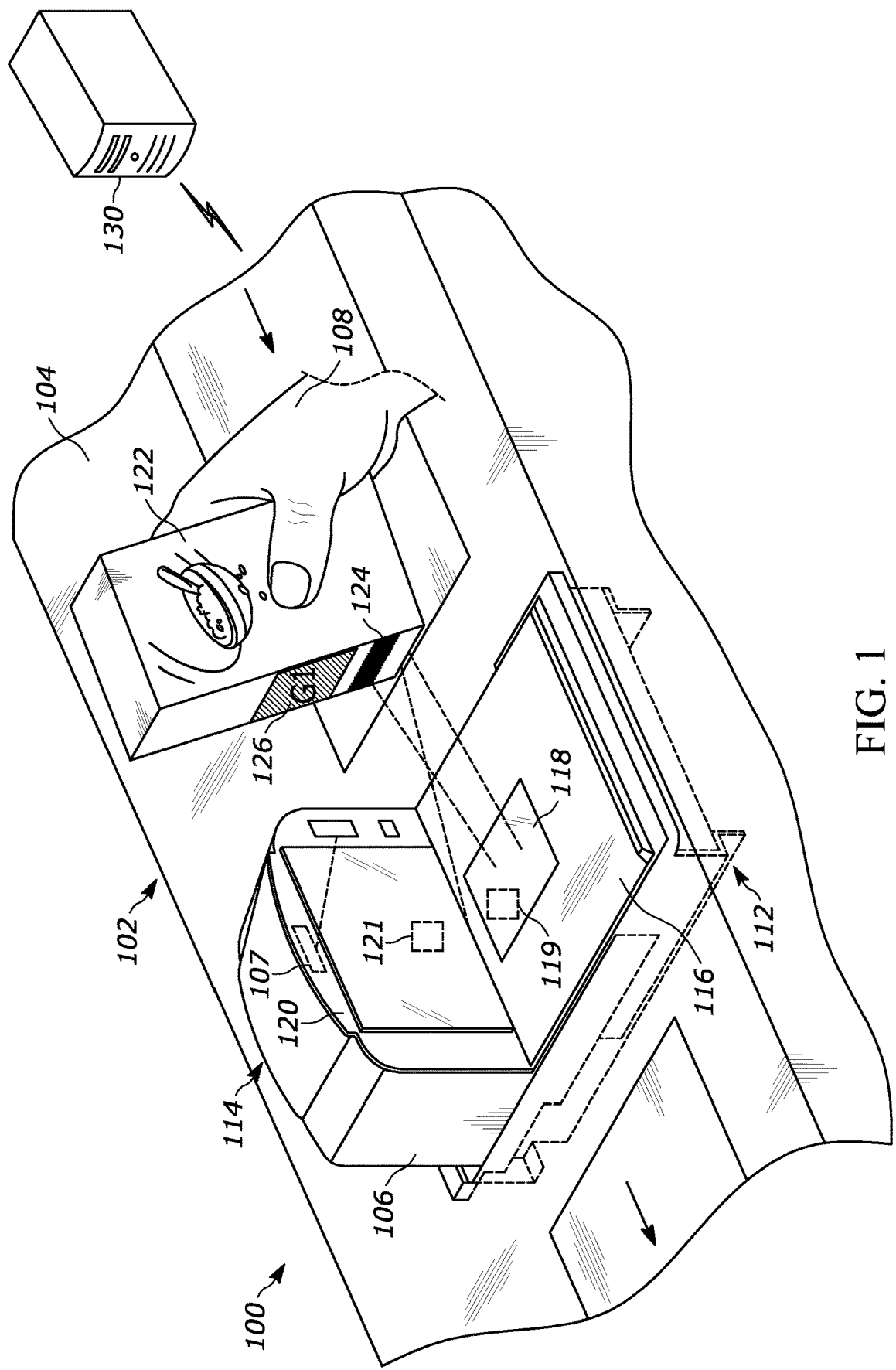
FIG. 1 is a perspective view of an example imaging system, implemented in an example point-of-sale (POS) system, having a bi-optical (also referred to as "bi-optic") imager, showing capture of an image of an item.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, the techniques provided herein utilize the substantially orthogonally oriented tower and platter imaging assemblies of a bi-optic scanner to generate an estimated volume of an item passing through the product-scanning region of the bi-optic scanner. The tower imaging assembly and the platter imaging assembly may each capture images of an item passing through the product scanning region at substantially the same time. The distance of the item from the platter may be derived from the image captured by the tower imaging assembly, while the distance of the item from the tower may be derived from the image captured by the platter imaging assembly. The relative area of the "face" of the item as shown in the image captured by the platter imaging assembly may be scaled using the distance from the item to the platter imaging assembly in order to determine an actual area of the portion of the item facing the platter imaging assembly. Similarly relative area of the "face" of the item as shown in the image captured by the tower imaging assembly may be scaled using the distance from the item to the tower imaging assembly in order to determine an actual area of the portion of the item facing the tower imaging assembly. The actual area of the portion of the item facing the platter imaging assembly and the actual area of the portion of the item facing the tower imaging assembly may then be used to generate an estimated volume of the item. That is, the area of the item facing one of the imaging assemblies, with the height (depth) of the item facing the other imaging assembly may be used to determine an estimated volume of the item. The estimated volume of the item may then be used to distinguish between differently sized items that otherwise appear to be similar, or to identify instances of ticket switching in which the volume of an item identified by decoding a barcode attached thereto does not match the estimated volume of the item.

FIG. 1 illustrates a perspective view of an example imaging system capable of implementing operations of the example methods described herein, as may be represented by the flowcharts of the drawings that accompany this description. In the illustrated example, an imaging system 100 is in the form of a point-of-sale (POS) system, having a workstation 102 with a counter 104, a bi-optical (also referred to as "bi-optic") scanner 106, and an additional camera 107 (e.g., a video camera) at least partially positioned within a housing of the barcode reader 106. In examples herein, the bi-optic scanner 106 is referred to as a barcode reader.

Imaging systems herein may include any number of imagers housed in any number of different devices. While FIG. 1 illustrates an example bi-optic barcode reader 106 as the imager, in other examples, the imager may be a handheld device, such as a handheld barcode reader, or a fixed imager, such as barcode reader held in place in a base and operated within what is termed a "presentation mode."

In the illustrated example, the barcode reader 106 includes a lower housing 112 and a raised housing 114. The lower housing 112 may be referred to as a first housing portion and the raised housing 114 may be referred to as a tower or a second housing portion. The lower housing 112 includes a top portion 116 with a first optically transmissive window 118 positioned therein along a generally horizontal plane relative to the overall configuration and placement of the barcode reader 106. In some examples, the top portion 116 may include a removable or a non-removable platter (e.g., a weighing platter including an electronic weighing scale).

In the illustrated example of FIG. 1, the barcode reader 106 captures images of an item, in particular an item 122, such as, e.g., a package or a produce item. In some implementations, the barcode reader 106 captures these images of the item 122 through one of the first and second optically transmissive windows 118, 120, by respective imaging assemblies 119, 121. For example, image capture may be done by positioning the item 122 within the fields of view of the imaging assemblies 119, 121 housed inside the barcode reader 106. In particular, a first imaging assembly 119 may capture images of the item 122 from a first field of view through the first optically transmissive window 118, and a second imaging assembly 121 may capture images of the item 122 from a second field of view through the second optically transmissive window 120. The first field of view and the second field of view may be orthogonal to one another (e.g., within 25 degrees of orthogonal), or otherwise offset from one another at different angles. The barcode reader 106 may capture images through these windows 118, 120 by the first imaging assembly 119 and second imaging assembly 121, such that a barcode 124 associated with the item 122 may be digitally read through at least one of the first and second optically transmissive windows 118, 120. In the illustrated example of FIG. 1, additionally, the barcode reader 106 may capture images of the item 122 using the camera 107, which may be implemented as a color camera, video camera, or other camera.

In the illustrated example of FIG. 1, the imaging system 100 includes a server 130 communicatively coupled to the barcode reader 106 through a wired or wireless communication link. In some examples, the server 130 is a remote server, while in other examples, the server 130 is a local server. The server 130 is communicatively coupled to a plurality of imaging systems 100 positioned at checkout area of a facility, for example.

Figure 2:
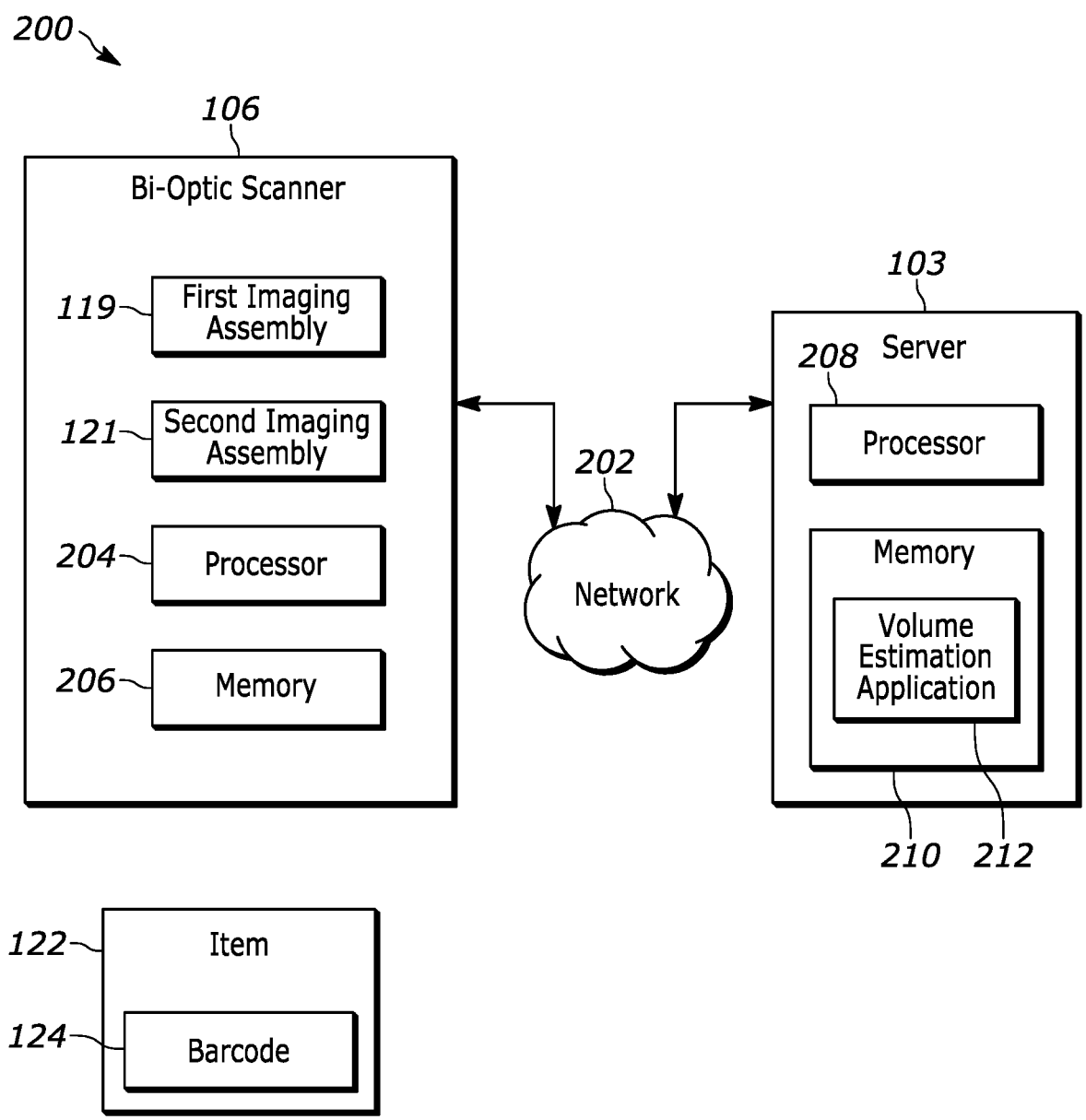
FIG. 2 illustrates a block diagram of an example logic circuit for implementing example methods and/or operations described herein including techniques for volumetric assessment of a product based on images captured by a bi-optic scanner.

FIG. 2 illustrates an example system where embodiments of the present invention may be implemented, such as the imaging system 100 of FIG. 1, where various items may be scanned for completing a purchase of an item.

In the illustrated example, the location 200 is a point of sale location and includes a bi-optic scanner 106 and a server 103, which may communicate via a network 202 (and/or via a wired interface, not shown). In some embodiments, the device referred to as "server 103" may be a single board computer (SBC) 103. The server 103 may be local to the bi-optic scanner 106, or may even be part of the bi-optic scanner 106 in some embodiments. In other embodiments, the server 103 may be located remotely from the bi-optic scanner 106. The bi-optic scanner 106 may include a network interface (not shown) that represents any suitable type of communication interface(s) (e.g., wired interfaces such as Ethernet or USB, and/or any suitable wireless interfaces) configured to operate in accordance with any suitable protocol(s) for communicating with the server 103 over the network 202.

The bi-optic scanner 106 may include a first imaging assembly 119 and a second imaging assembly 121. For instance, the first imaging assembly 119 and the second imaging assembly 121 may be included within a bi-optic housing of the bi-optic scanner 106. The bi-optic scanner 106 may include one or more processors 204, which may be, for example, one or more microprocessors, controllers, and/or any suitable type of processors, and a memory 206 accessible by the processor 204 (e.g., via a memory controller). The first imaging assembly 119 and the second imaging assembly 121, may include cameras or other suitable black-and-white or color image sensors, may be configured such that the first imaging assembly 119 and the second imaging assembly 121 have fields of view of a product-scanning region that are orthogonal to one another (e.g., within 25 degrees of orthogonal), or otherwise offset at different angles. The first imaging assembly 119 and the second imaging assembly 121 may be configured to capture images of an item 122 (e.g., an item to be purchased at the scanning station 202) passing through the product scanning region, as well as a barcode 124 (or other symbology) attached thereto or otherwise associated therewith. For instance, in some examples, the first imaging assembly 119 and the second imaging assembly 121 may capture substantially simultaneous images of the same item as it passes through the product scanning region. In some examples, an additional color camera 107 (as shown in FIG. 1, not shown in FIG. 2) may be used to capture additional images of larger items that pass through the product scanning region. The example processor 204 may interact with the memory 206 to obtain, for example, machine-readable instructions stored in the memory 206 corresponding to, for example, the operations represented by the flowcharts of this disclosure, including those of FIG. 5. In particular, the instructions stored in the memory 206, when executed by the processor 204, may cause the processor 204 to analyze images of the barcode 124 to decode the barcode 124. Furthermore, the instructions stored in the memory 206, when executed by the processor 204, may cause the processor 204 to send images of items 122 passing through the product scanning region, as captured by the imaging assemblies 119, 121 (and/or the camera 107), and/or successfully decoded barcodes 124, to the sever 103. Additionally or alternatively, machine-readable instructions corresponding to the example operations described herein may be stored on one or more removable media (e.g., a compact disc, a digital versatile disc, removable flash memory, etc.) that may be coupled to the bi-optic scanner 106 to provide access to the machine-readable instructions stored thereon.

The server 103 may include one or more processors 208, which may be, for example, one or more microprocessors, controllers, and/or any suitable type of processors, and a memory 210 accessible by the one or more processors 208 (e.g., via a memory controller). An example processor 208 may interact with the memory 210 to obtain, for example, machine-readable instructions stored in the memory 210 corresponding to, for example, the operations represented by the flowcharts of this disclosure, including those of FIG. 6. For instance, the instructions stored in the memory 210, when executed by the processor 208, may cause the processor 208 to receive images of items 122 passing through the product scanning region, as captured by the imaging assemblies 119, 121 (and/or the camera 107), and/or successfully decoded barcodes 124 from the bi-optic scanner 106. Furthermore, the instructions stored in the memory 210, when executed by the processor 208, may cause the processor 208 to execute a volume estimation application 212, which may analyze the images of items 122 passing through the product scanning region, as captured by the imaging assemblies 119, 121 in order to generate estimated volumes for the items 122.

Figure 3B:
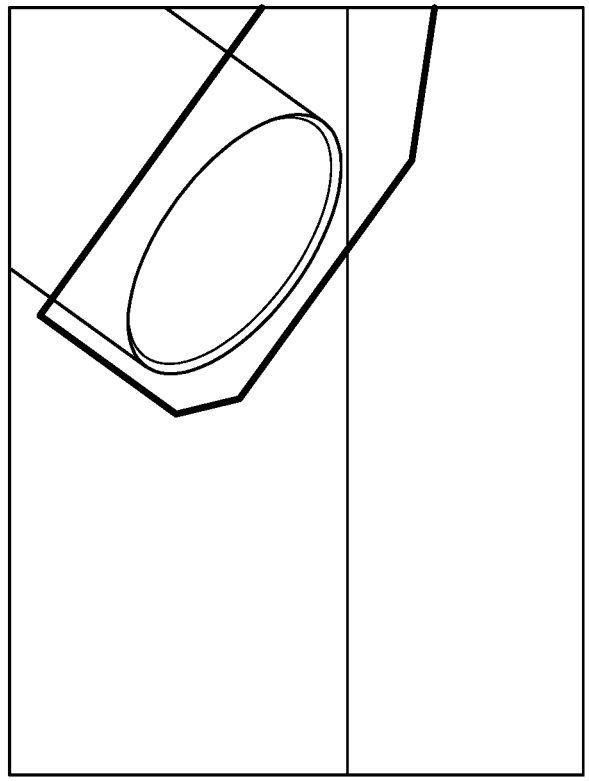
FIG. 3B illustrates an example second image of the item captured by a second imaging assembly of a bi-optic scanner having a second field of view.
Figure 3A:
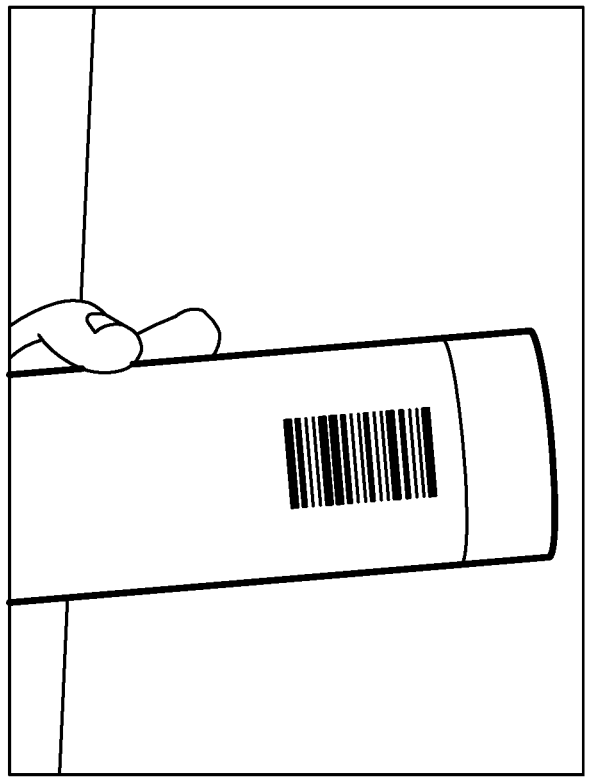
FIG. 3A illustrates an example first image of an item captured by a first imaging assembly of a bi-optic scanner having a first field of view.

In particular, executing the volume estimation application 212 may include receiving (or, in some cases, causing the imaging assemblies 119, 121 and/or the camera 107 to capture) images of an item 122 passing through the product scanning region from two orthogonal fields of view (e.g., within 25 degrees of orthogonal). The two images of the item 122 may be captured at substantially the same time. For example, FIG. 3A illustrates an example first image of an item 122 captured by a first imaging assembly 119 of a bi-optic scanner 103 having a first field of view, and FIG. 3B illustrates an example second image of the item 122 captured by a second imaging assembly 121 of a bi-optic scanner 103 having a second field of view. These images may be analyzed using background removal techniques and segmentation to determine the relative areas of the portions of the item 122 facing each of the imaging assemblies 119, 121 in the images. For instance, a mixture of Gaussians (MOG2) technique may utilize multiple frames to find the bounds of the largest moving blob in each image or set of images from each imaging assembly 119, 121.

Figure 4:
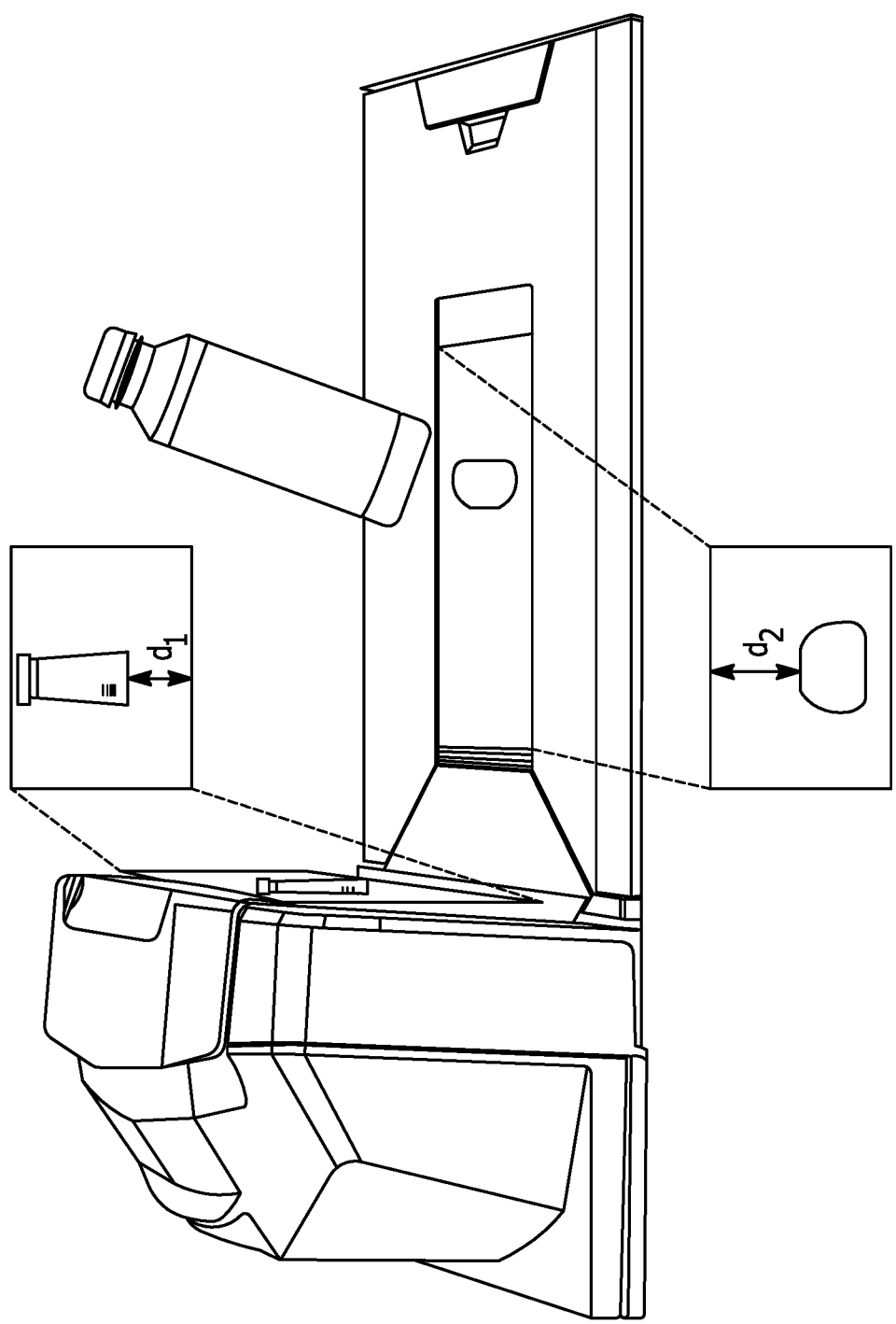
FIG. 4 illustrates an example of how two distances from an item to a bi-optic scanner may be determined based on images captured by two imaging assemblies of the bi-optic scanner.

FIG. 4 illustrates an example of how two distances from an item to edges of respective fields of view of two imaging assemblies 119, 121 of a bi-optic scanner 103 may be determined based on images captured by the two imaging assemblies 119, 121. For instance, based on the first image captured by the first imaging assembly 119, a distance ("d1," as shown in FIG. 4) of the item 122 from the edge of the field of view of the first imaging assembly 119 may be determined. Similarly, based on the second image captured by the second imaging assembly 121, a distance ("d2" as shown in FIG. 4) of the item 122 from a corresponding edge of the field of view of the second imaging assembly 121 may be determined.

FIG. 5A illustrates an example schematic diagram of an item positioned within fields of view (FOV) 502, 504, of two imaging assemblies of a bi-optic scanner. The FOVs 502, 504 may be substantially orthogonal (e.g., within 25 degrees of orthogonal, within 15 degrees of orthogonal, within 10 degrees of orthogonal). FIG. 58 illustrates an example of an image of the item 122 shown at FIG. 5A, as captured by a first imaging assembly of the bi-optic scanner of FIG. 5A via FOV 502, while FIG. 5C illustrates an example of an image of the item 122 shown at FIG. 5A, as captured by a second imaging assembly of the bi-optic scanner of FIG. 5A via FOV 504. It should be apparent that references to first and second imaging assembly can also refer to various portions of the same image sensor if the primary FOV is split my way of mirrors or both imaged could be captured by the same imaging assembly by using, for example, a periodically positioned mirror in front of the FOV which redirects the FOV and causes the imager to capture an image of a different environment.

With reference to FIGS. 5A-5C, the volume estimation application 212 may identify an edge 506 of the image of the first field of view 502 shown at FIG. 5B, that corresponds to an edge 508 of the image of the second field of view 504, shown at FIG. 5C. The volume estimation application 212 may determine a pixel distance 510 from the item 122 to the edge 506 of the first field of view 502, as shown at FIG. 5B. Similarly, the volume estimation application 212 may determine a pixel distance 512 from the item 122 to the edge 508 of the second field of view 504, as shown at FIG. 5C.

The pixel distance 510 from the item 122 from the edge 506 of the first field of view 502, and the pixel distance 512 from the item 122 to the corresponding edge 508 of the second field of view 504 may be accessed in a lookup table, in order to determine the actual distance from the item 122 to the edge 506 of the first field of view 502 and the actual distance from the item 122 to the corresponding edge 508 of the second field of view 504. In particular, the lookup table may be specifically calibrated to the particular orientations, fields of view, and distances of the imaging assemblies of the bi-optic scanner, such that given a pixel distance of a point from an edge of the field of view of the first imaging assembly as shown in an image captured by the first imaging assembly and a pixel distance from the same point from a corresponding edge of the field of view of the second imaging assembly as shown in an image captured by the second imaging assembly, the actual distance of the point from the edge of the field of view of the first imaging assembly and the actual distance from the same point to a corresponding edge of the field of view of the second imaging assembly may be found in the lookup table.

The ratio of the pixel distance 510 of the item to the edge 506 of the first field of view 502 to the actual distance of the item 122 to the edge 506 of the first field of view 502 may be used as a scaling factor to determine the actual area of the face of the item 122 in the first image shown at FIG. 5B, and/or the actual height or width of the face of the item 122 in the first image, based on the pixel area, the pixel height 514, and/or the pixel width of the face of the item 122 in the first image. Similarly, the ratio of the pixel distance 512 of the item to the edge 508 of the second field of view 504 to the actual distance of the item to the edge 508 of the second field of view 504 may be used as a scaling factor to determine the actual area of the face of the item 122 in the second image shown at FIG. 5C, and/or the actual height or width of the face of the item in the second image, based on the pixel area, the pixel height, and/or the pixel width 516 of the face of the item in the second image.

For example, the volume estimation application 212 may estimate the volume of the item 122 based on multiplying the actual area of the face of the item 122 as shown in the first image shown at FIG. 58 by the height 516 of the face of the item 122 as shown in the second image shown at FIG. 5C. Similarly, the volume estimation application 212 may estimate the volume of the item 122 based on multiplying the actual area of the face of the item 122 as shown in the second image shown at FIG. 5C by the height 514 of the face of the item 122 as shown in the first image shown at FIG. 58.

Referring back to FIG. 2, while the volume estimation application 212 is shown as being stored on the memory 210 and executed by the processor 208, in some examples, the volume estimation application 212, or an instance of the volume estimation application 212, may be stored on the memory 206, or another memory of the bi-optic scanner 106, and executed by the processor 204, or another processor of the bi-optic scanner 106.

Moreover, in some examples, additional or alternative applications may be included in various embodiments. Furthermore, in some examples, applications or operations described herein as being performed by the processor 206 may be performed by the processor 204, and vice versa. Additionally or alternatively, machine-readable instructions corresponding to the example operations described herein may be stored on one or more removable media (e.g., a compact disc, a digital versatile disc, removable flash memory, etc.) that may be coupled to the server 103 to provide access to the machine-readable instructions stored thereon.

Figure 6:
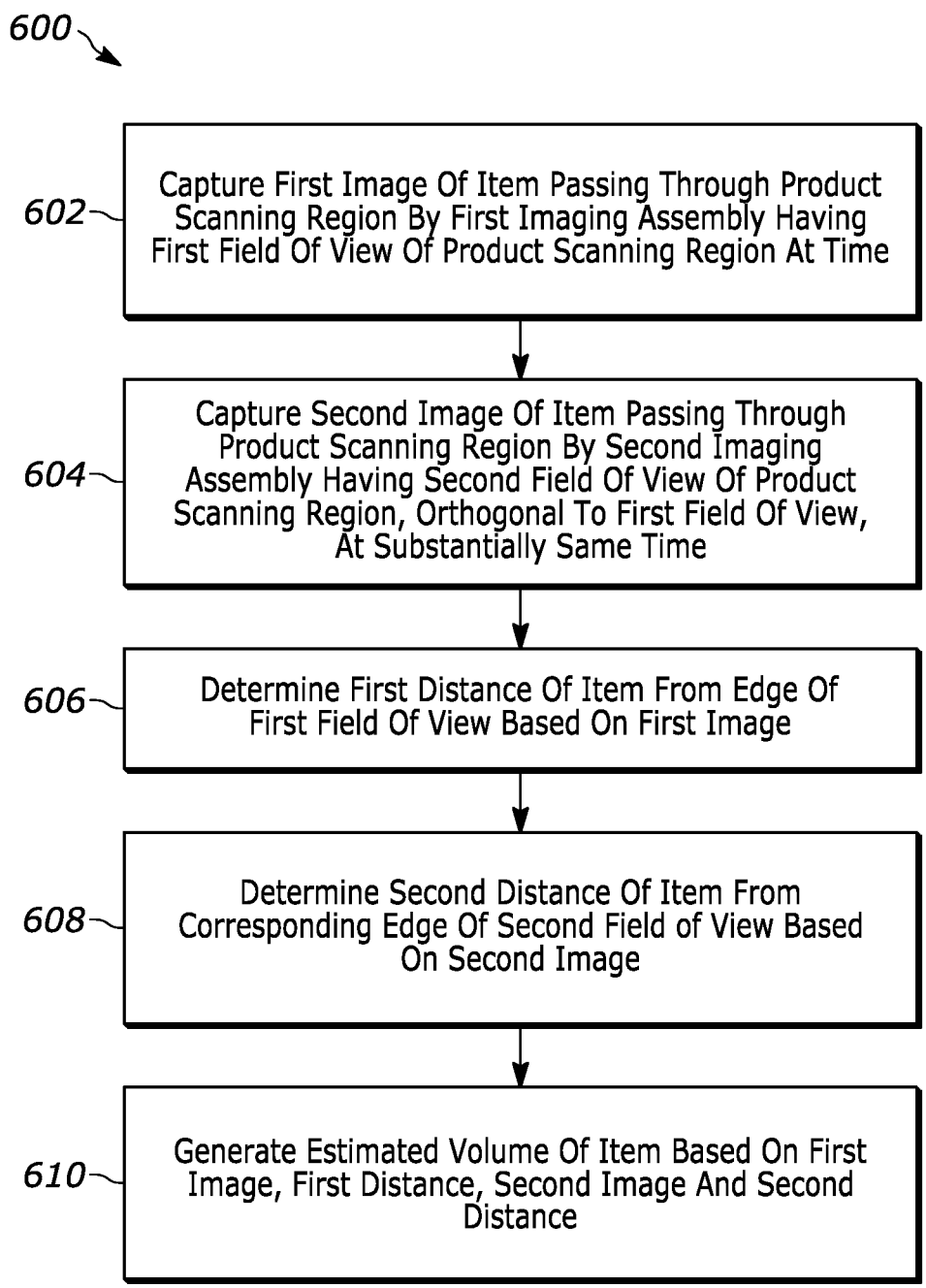
FIG. 6 illustrates a block diagram of an example process as may be implemented by the logic circuit of FIG. 2, for implementing example methods and/or operations described herein including techniques for volumetric assessment of a product based on images captured by a bi-optic scanner.

FIG. 6 illustrates a block diagram of an example process 600 as may be implemented by the logic circuit of FIG. 2, for implementing example methods and/or operations described herein including techniques for volumetric assessment of a product based on images captured by a bi-optic scanner, as may be performed by the imaging system 100 of FIG. 1 and/or by the system 200 in FIG. 2.

At block 602, a first imaging assembly, having a first field of view of a product scanning region, may capture a first image of an item passing through the product scanning region at a time.

At block 604, a second imaging assembly, having a second field of view of the product scanning region that is orthogonal to the first field of view of the product scanning region, may capture a second image of the item passing through the product scanning region at substantially the same time.

At block 606, a first distance of the item from an edge of the field of view captured by the first imaging assembly may be determined based on the first image.

At block 608, a second distance of the item from a corresponding edge of the field of view captured by the second imaging assembly may be determined based on the second image.

At block 610, an estimated volume of the item may be generated based on the first image, the first distance, the second image, and the second distance. For instance, generating the estimated volume of the item based on the first image, the first distance, the second image, and the second distance further includes: analyzing the first image using segmentation to identify a first outer boundary of the item in the first image, and analyzing the second image using segmentation to identify a second outer boundary of the item in the second image.

For example, a first relative area of the first outer boundary of the item in the first image may be determined, and a second relative area of the outer boundary of the item in the second image may be determined. A first actual area of the first outer boundary of the item in the first image may then be determined based on the first relative area of the first outer boundary of the item in the first image and the first distance. Similarly, a second actual area of the second outer boundary of the item in the second image may then be determined based on the second relative area of the second outer boundary of the item in the second image and the second distance. The estimated volume may then be generated based on the first actual area and the second actual area (or the first actual area and the second distance, or the second actual area and the first distance).

In some examples, the method 600 may further include determining multiple possible identifications of the item (e.g., a first possible identification of the item, a second possible identification of the item, a third possible identification of the item, etc.) based on the first image and/or the second image, and selecting between the multiple possible identifications of the item based on the estimated volume of the item. For instance, the first possible identification of the item may be a first size of a particular type of item (e.g., 16 fl oz juice), while the second possible identification of the item may be a second size of the same type of item (e.g., 32 fl oz juice), which appear to be similar in the first and second images, e.g., due to similar packaging, and the estimated volume of the item may indicate whether the item is more likely to be the first size or the second size.

Additionally, in some examples, the method 600 may further include determining a possible identification of the item based on decoding a barcode affixed to the item appearing in one or more of the first or second image. A volume associated with the possible identification of the item may be determined based on decoding the barcode. For instance, decoding the barcode may indicate that the barcode is associated with a particular product. A volume associated with that product indicated by the barcode may be determined and compared to the estimated volume of the item. An alert may in turn be generated based on a volume difference between the determined volume associated with the possible identification of the item and the estimated volume of the item being greater than a threshold volume difference.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or to perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A system for volumetric assessment of a product based on images captured by a scanning arrangement having multiple fields of view (FOVs), comprising:
   a first imaging assembly, having a first field of view of a product scanning region, configured to capture a first image of an item passing through the product scanning region at a time;
   a second imaging assembly, having a second field of view of the product scanning region, the second imaging assembly being configured to capture a second image of the item passing through the product scanning region at a second time that is either the same or substantially the same as the time;
   one or more processors; and
   a memory storing computer readable instructions that, when executed by the one or more processors, cause the one or more processors to:
      determine a first distance of the item from an edge of the first field of view based on the first image;
      determine a second distance of the item from a corresponding edge of the second field of view based on the second image; and
      generate an estimated volume of the item based on the first image, the first distance, the second image, and the second distance.

2. The system of claim 1, wherein generating the estimated volume of the item based on the first image, the first distance, the second image, and the second distance further includes:
   analyzing the first image using segmentation to identify a first outer boundary of the item in the first image; and
   analyzing the second image using segmentation to identify a second outer boundary of the item in the second image.

3. The system of claim 2, wherein generating the estimated volume of the item based on the first image, the first distance, the second image, and the second distance further includes:
   determining a first relative area of the first outer boundary of the item in the first image;
   determining a second relative area of the second outer boundary of the item in the second image;
   determining a first actual area of the first outer boundary of the item in the first image based on the first relative area of the first outer boundary of the item in the first image and the first distance; and
   determining a second actual area of the second outer boundary of the item in the second image based on the second relative area of the second outer boundary of the item in the second image and the second distance;
   wherein generating the estimated volume is based on the first actual area and the second actual area.

4. The system of claim 1, wherein the instructions, when executed by the one or more processors, further cause the one or more processors to:
   determine, based on one or more of the first or second image, a first possible identification of the item and a second possible identification of the item; and
   select between the first identification of the item and the second identification of the item based on the estimated volume of the item.

5. The system of claim 1, wherein the instructions, when executed by the one or more processors, further cause the one or more processors to:
   determine, based on decoding a barcode affixed to the item, a possible identification of the item;
   determine, based on the possible identification of the item, a volume associated with the possible identification of the item;
   compare the volume associated with the possible identification of the item to the estimated volume of the item; and
   generate an alert based on a volume difference between the volume associated with the possible identification of the item and the estimated volume of the item being greater than a threshold volume difference.

6. The system of claim 1, wherein the scanning arrangement is housed within a bioptic barcode reader.

7. The system of claim 1, wherein the second field of view is substantially orthogonal to the first field of view.

8. The system of claim 1, wherein the first imaging assembly is associated with a first portion of an imaging sensor and the second imaging assembly is associated with a second portion of the imaging sensor, and
   wherein the first FOV and the second FOV are produced by at least one splitter mirror positioned within primary FOV of the imaging sensor.

9. A method for volumetric assessment of a product based on images captured by scanning arrangement having multiple imaging assemblies, comprising:
    capturing, by a first imaging assembly, having a first field of view of a product scanning region, a first image of an item passing through the product scanning region at a time;
    capturing, by a second imaging assembly, having a second field of view of the product scanning region, a second image of the item passing through the product scanning region at substantially the same time;
    determining, by one or more processors, a first distance of the item from an edge of the first field of view based on the first image;
    determining, by the one or more processors, a second distance of the item from a corresponding edge of the second field of view based on the second image; and
    generating, by the one or more processors, an estimated volume of the item based on the first image, the first distance, the second image, and the second distance.

10. The method of claim 9, wherein generating the estimated volume of the item based on the first image, the first distance, the second image, and the second distance further includes:
    analyzing the first image using segmentation to identify a first outer boundary of the item in the first image; and
    analyzing the second image using segmentation to identify a second outer boundary of the item in the second image.

11. The method of claim 10, wherein generating the estimated volume of the item based on the first image, the first distance, the second image, and the second distance further includes:
    determining a first relative area of the first outer boundary of the item in the first image;
    determining a second relative area of the second outer boundary of the item in the second image;
    determining a first actual area of the first outer boundary of the item in the first image based on the first relative area of the first outer boundary of the item in the first image and the first distance; and
    determining a second actual area of the second outer boundary of the item in the second image based on the second relative area of the second outer boundary of the item in the second image and the second distance;
    wherein generating the estimated volume is based on the first actual area and the second actual area.

12. The method of claim 9, further comprising:
    determining, by the one or more processors, based on one or more of the first or second image, a first possible identification of the item and a second possible identification of the item; and
    selecting, by the one or more processors, between the first identification of the item and the second identification of the item based on the estimated volume of the item.

13. The method of claim 9, further comprising:
    determining, by the one or more processors, based on decoding a barcode affixed to the item in one or more of the first or second image, a possible identification of the item;
    determining, by the one or more processors, based on the possible identification of the item, a volume associated with the possible identification of the item;
    comparing, by the one or more processors, the determined volume associated with the possible identification of the item to the estimated volume of the item; and
    generating, by the one or more processors, an alert based on a volume difference between the determined volume associated with the possible identification of the item and the estimated volume of the item being greater than a threshold volume difference.

14. The method of claim 9, wherein the scanning arrangement is housed within a bioptic barcode reader.

15. The method of claim 9, wherein the second field of view is substantially orthogonal to the first field of view.

16. The method of claim 9, wherein the first imaging assembly is associated with a first portion of an imaging sensor and the second imaging assembly is associated with a second portion of the imaging sensor, and
    wherein the first FOV and the second FOV are produced by at least one splitter mirror positioned within primary FOV of the imaging sensor.

17. A tangible machine-readable medium comprising instructions for volumetric assessment of a product based on images captured by a scanning arrangement having multiple fields of view that, when executed, cause a machine to at least:
    receive a first image of an item passing through a product scanning region at a time, the first image being captured from a first field of view of the product scanning region;
    receive a second image of the item passing through the product scanning region at substantially the same time, the second image being captured through a second field of view of the product scanning region that is substantially orthogonal to the first field of view of the product scanning region;
    determine a first distance of the item from an edge of the first field of view based on the first image;
    determine a second distance of the item from a corresponding edge of the second field of view based on the second image; and
    generate an estimated volume of the item based on the first image, the first distance, the second image, and the second distance.

18. The tangible machine-readable medium of claim 17, wherein generating the estimated volume of the item based on the first image, the first distance, the second image, and the second distance further includes:
    analyzing the first image using segmentation to identify a first outer boundary of the item in the first image; and
    analyzing the second image using segmentation to identify a second outer boundary of the item in the second image.

19. The tangible machine-readable medium of claim 18, wherein generating the estimated volume of the item based on the first image, the first distance, the second image, and the second distance further includes:
    determining a first relative area of the first outer boundary of the item in the first image;
    determining a second relative area of the second outer boundary of the item in the second image;
    determining a first actual area of the first outer boundary of the item in the first image based on the first relative area of the first outer boundary of the item in the first image and the first distance; and
    determining a second actual area of the second outer boundary of the item in the second image based on the second relative area of the second outer boundary of the item in the second image and the second distance;
    wherein generating the estimated volume is based on the first actual area and the second actual area.

20. The tangible machine-readable medium of claim 17, wherein the instructions, when executed, further cause the machine to:

determine, based on one or more of the first or second image, a first possible identification of the item and a second possible identification of the item; and select between the first identification of the item and the second identification of the item based on the estimated volume of the item.

21. The tangible machine-readable medium of claim 17, wherein the instructions, when executed, further cause the machine to:

determine, based on decoding a barcode affixed to the item in one or more of the first or second image, a possible identification of the item;

determine, based on the possible identification of the item, a volume associated with the possible identification of the item;

compare the determined volume associated with the possible identification of the item to the estimated volume of the item; and generate an alert based on a volume difference between the determined volume associated with the possible identification of the item and the estimated volume of the item being greater than a threshold volume difference.

22. The tangible machine-readable medium of claim 17, wherein the scanning arrangement is housed within a bioptic barcode reader.

23. The tangible machine-readable medium of claim 17, wherein the second field of view is substantially orthogonal to the first field of view.

* * * * *